US012670720B2

(12) United States Patent
Zhang et al.

(10) Patent No.: US 12,670,720 B2
(45) Date of Patent: Jun. 30, 2026

(54) APPARATUS FOR OBSTACLE DETECTION BASED ON RELATIVE IMAGE MOTION

(71) Applicant: Magna Electronics Inc., Auburn Hills, MI (US)

(72) Inventors: Liang Zhang, Ottawa (CA); Nikhil Gupta, Brampton (CA)

(73) Assignee: Magna Electronics Inc., Auburn Hills, MI (US)

( * ) Notice: Subject to any disclaimer, the term of this patent is extended or adjusted under 35 U.S.C. 154(b) by 937 days.

(21) Appl. No.: 17/930,788

(22) Filed: Sep. 9, 2022

(65) Prior Publication Data

US 2023/0085024 A1 Mar. 16, 2023

Related U.S. Application Data

(60) Provisional application No. 63/261,123, filed on Sep. 13, 2021.

(51) Int. Cl.
*G06V 20/58* (2022.01)
*G06T 7/20* (2017.01)

(52) U.S. Cl.
CPC ................ *G06V 20/58* (2022.01); *G06T 7/20* (2013.01); *G06T 2207/10016* (2013.01); *G06T 2207/30252* (2013.01)

(58) Field of Classification Search
CPC .......... G06V 20/58; G06T 2207/10016; G06T 2207/30252; G06T 7/20
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 7,038,577 B2 | 5/2006 | Pawlicki et al. |
| 7,720,580 B2 | 5/2010 | Higgins-Luthman |

(Continued)

OTHER PUBLICATIONS

Hassaballah, M., Mourad A Kenk, and Ibrahim M. El-Henawy. "Local binary pattern-based on-road vehicle detection in urban traffic scene." Pattern Analysis and Applications 23.4 (Feb. 2020): 1505-1521. (Year: 2020).

(Continued)

*Primary Examiner* — Margaret G Webb
(74) *Attorney, Agent, or Firm* — HONIGMAN LLP

(57) ABSTRACT

A vehicular vision system includes a camera that captures image data. The vehicular vision system, responsive to processing by an image processor of image data captured by the camera, detects a plurality of objects present within the field of view of the camera. The vehicular vision system, responsive to detecting the objects, generates a plurality of intra-hypotheses. The vehicular vision system, responsive to generating the plurality of intra-hypotheses, generates a plurality of inter-hypothesis, with each inter-hypothesis (i) based on at least one of the intra-hypotheses and (ii) representing a respective detected object different from each other inter-hypothesis. The vehicular vision system, responsive to generating the plurality of inter-hypothesis tracks the detected object. The vehicular vision system, responsive to tracking the object, controls a driver assistance system of the vehicle.

15 Claims, 9 Drawing Sheets

(56)  References Cited

U.S. PATENT DOCUMENTS

| 7,855,755 | B2 | 12/2010 | Weller et al. |
| 8,581,983 | B2 | 11/2013 | Shi et al. |
| 9,205,776 | B2 | 12/2015 | Turk |
| 9,487,235 | B2 | 11/2016 | Bajpai et al. |
| 9,547,795 | B2 | 1/2017 | Gupta |
| 9,563,951 | B2 | 2/2017 | Okouneva |
| 9,619,716 | B2 | 4/2017 | Pflug |
| 9,898,671 | B2 | 2/2018 | Gupta et al. |
| 9,946,940 | B2 | 4/2018 | Gupta et al. |
| 10,071,687 | B2 | 9/2018 | Ihlenburg et al. |
| 10,078,789 | B2 | 9/2018 | Gupta et al. |
| 10,095,935 | B2 | 10/2018 | Gupta |
| 10,099,614 | B2 | 10/2018 | Diessner |
| 10,204,279 | B2 | 2/2019 | Gupta et al. |
| 10,210,399 | B2 | 2/2019 | Sabeti |
| 10,210,404 | B2 | 2/2019 | Gupta et al. |
| 10,268,904 | B2 | 4/2019 | Gupta |
| 10,449,899 | B2 | 10/2019 | Gupta et al. |
| 10,452,931 | B2 | 10/2019 | Gupta |
| 10,677,894 | B2 | 6/2020 | Wodrich et al. |
| 10,713,506 | B2 | 7/2020 | Gupta et al. |
| 10,755,110 | B2 | 8/2020 | Bajpai |
| 10,883,846 | B2 | 1/2021 | Seifert |
| 11,175,516 | B1 | 11/2021 | Canberk et al. |
| 2011/0133917 | A1* | 6/2011 | Zeng ...................... G06T 7/246 |
| | | | 340/436 |
| 2013/0142426 | A1 | 6/2013 | Kaneda et al. |
| 2014/0193071 | A1 | 7/2014 | Cho et al. |
| 2016/0180158 | A1 | 6/2016 | Gupta et al. |
| 2018/0307911 | A1 | 10/2018 | Zohourian et al. |
| 2021/0035273 | A1 | 2/2021 | Deng et al. |
| 2021/0216752 | A1 | 7/2021 | Trani et al. |
| 2022/0101024 | A1 | 3/2022 | Zhang et al. |
| 2022/0309341 | A1* | 9/2022 | Brox ................... G06N 3/0464 |

OTHER PUBLICATIONS

Karis, Mohd Safirin, et al. "Local Binary Pattern (LBP) with application to variant object detection: A survey and method." 2016 IEEE 12th International Colloquium on Signal Processing & Its Applications (CSPA). IEEE, 2016. (Year: 2016).

Xu, Xue-mei, et al. "Vehicle detection algorithm based on codebook and local binary patterns algorithms." Journal of Central South University 22.2 (2015): 593-600. (Year: 2015).

* cited by examiner

APPARATUS FOR OBSTACLE DETECTION BASED ON RELATIVE IMAGE MOTION

CROSS REFERENCE TO RELATED APPLICATION

The present application claims the filing benefits of U.S. provisional application Ser. No. 63/261,123, filed Sep. 13, 2021, which is hereby incorporated herein by reference in its entirety.

FIELD OF THE INVENTION

The present invention relates generally to a vehicular vision system for a vehicle and, more particularly, to a vehicular vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A driving assistance system or vision system or imaging system for a vehicle includes a camera disposed at a vehicle equipped with the vehicular vision system. The camera views exterior of the vehicle and captures image data. The system includes an electronic control unit (ECU) with electronic circuitry and associated software. The electronic circuitry of the ECU includes an image processor for processing image data captured by the camera. The vehicular vision system, responsive to processing at the ECU of image data captured by the camera, detects a plurality of objects present within the field of view of the camera. The vehicular vision system, responsive to detecting the plurality of objects, generates a plurality of intra-hypotheses. Each detected object of the plurality of detected objects is represented by at least one intra-hypothesis of the plurality of intra-hypotheses. The vehicular vision system, responsive to generating the plurality of intra-hypotheses, generates a plurality of inter-hypotheses. Each inter-hypothesis of the plurality of inter-hypotheses (i) is based on at least one of the plurality of intra-hypotheses and (ii) represents a respective detected object of the plurality of objects. Each respective detected object represented by each respective inter-hypothesis is different from any other respective detected objects represented by the other respective inter-hypotheses. The vehicular vision system tracks each detected object of the plurality of objects based on the generated plurality of inter-hypotheses. The vehicular vision system, responsive to tracking each detected object, controls a driver assistance system of the vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
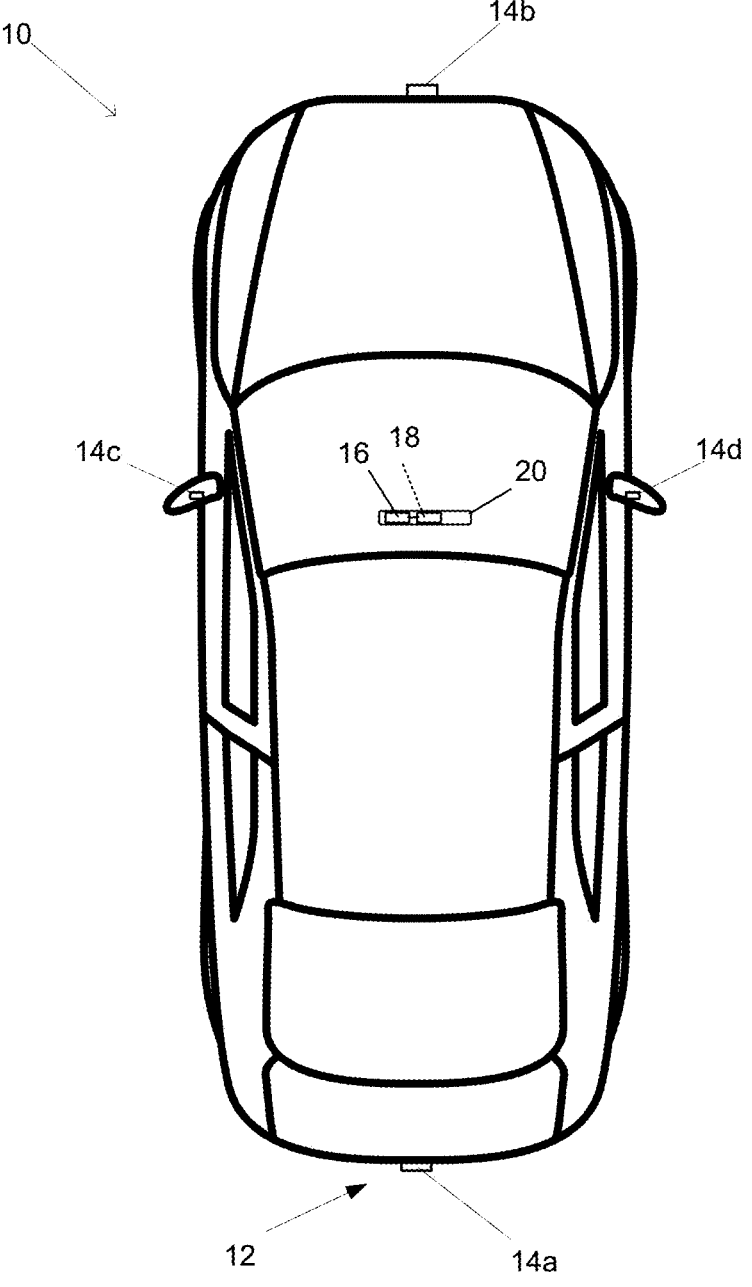
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
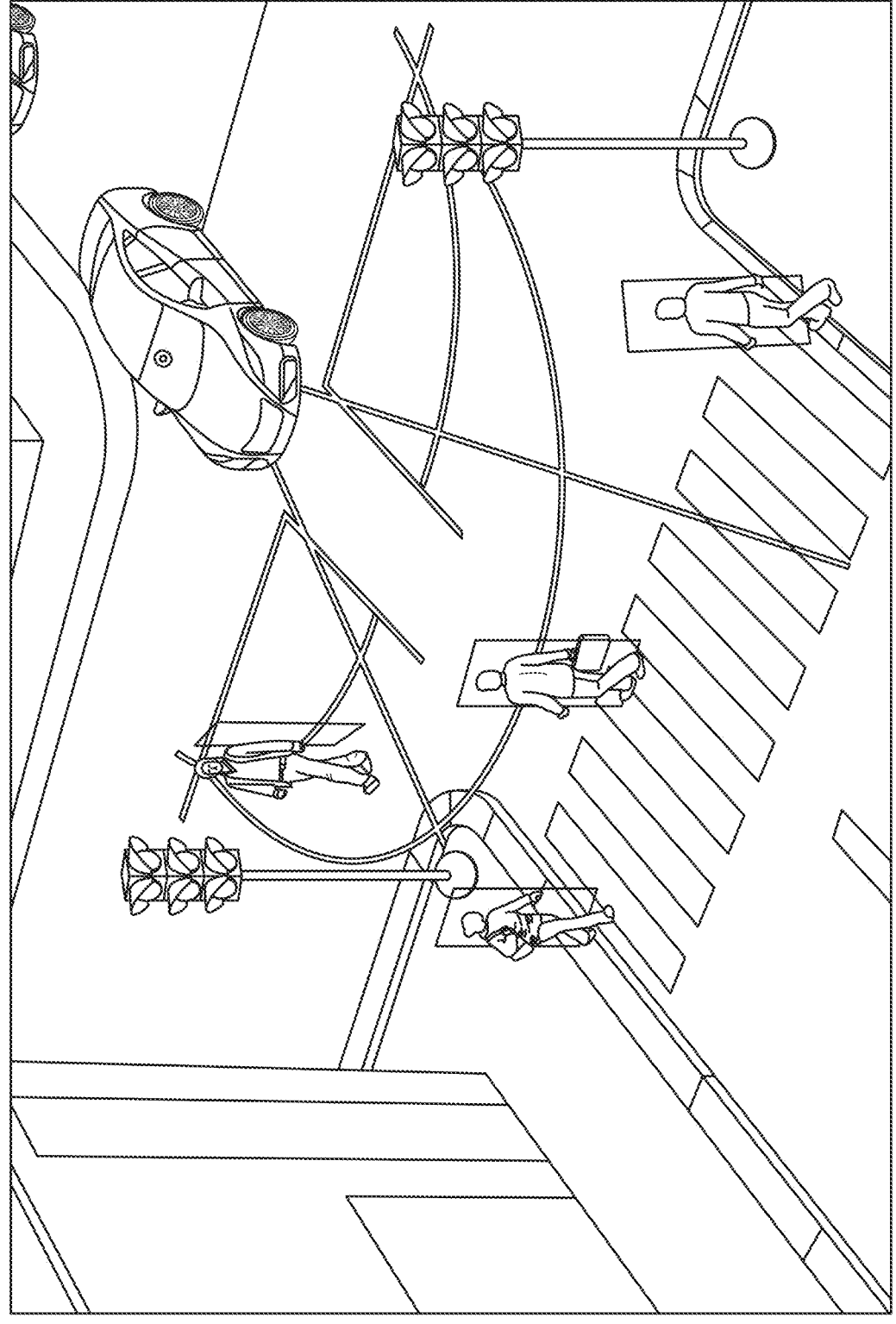
FIG. 2 is a perspective view of a vehicle and pedestrians forward of the vehicle.
Figure 3:
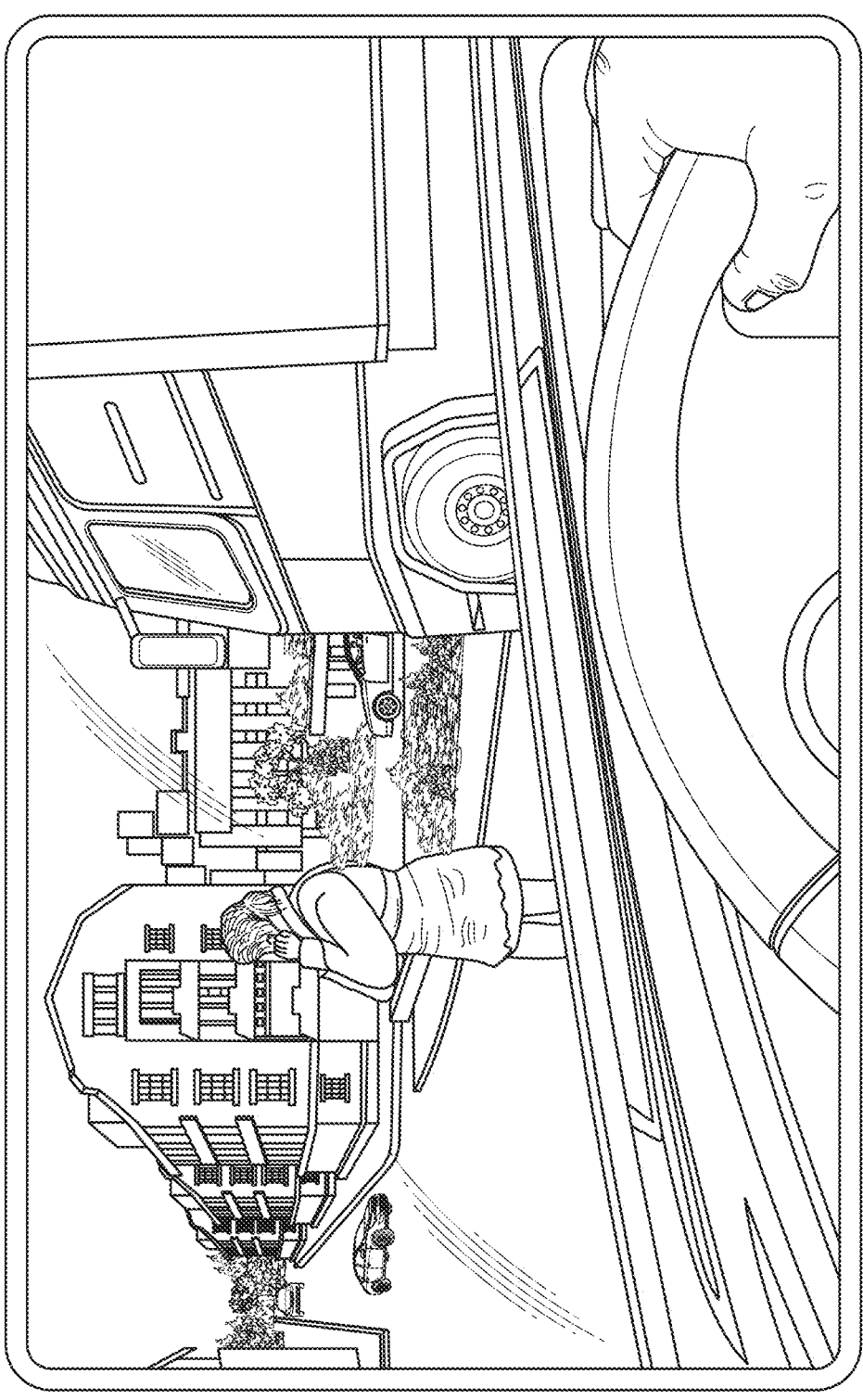
FIG. 3 is an image of a pedestrian in front of a vehicle as may be viewed by a driver of the vehicle.
Figure 4C:
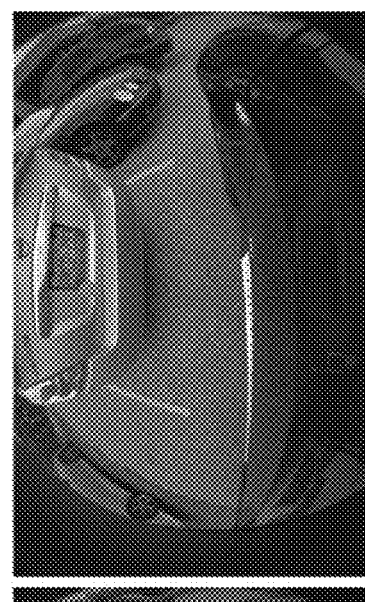
FIGS. 4A-4F show images captured by a vehicle camera using fisheye optics.
Figure 4B:
Figure 4A:
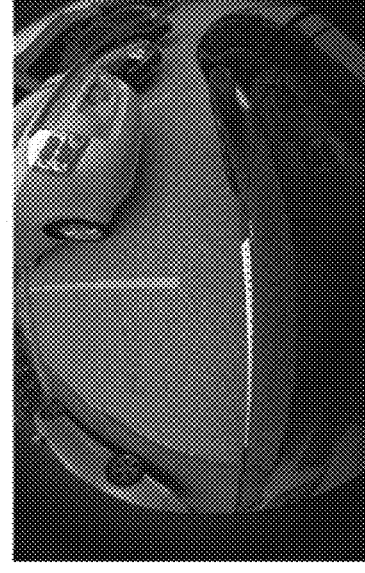
Figures 4D, 4E, 4F:
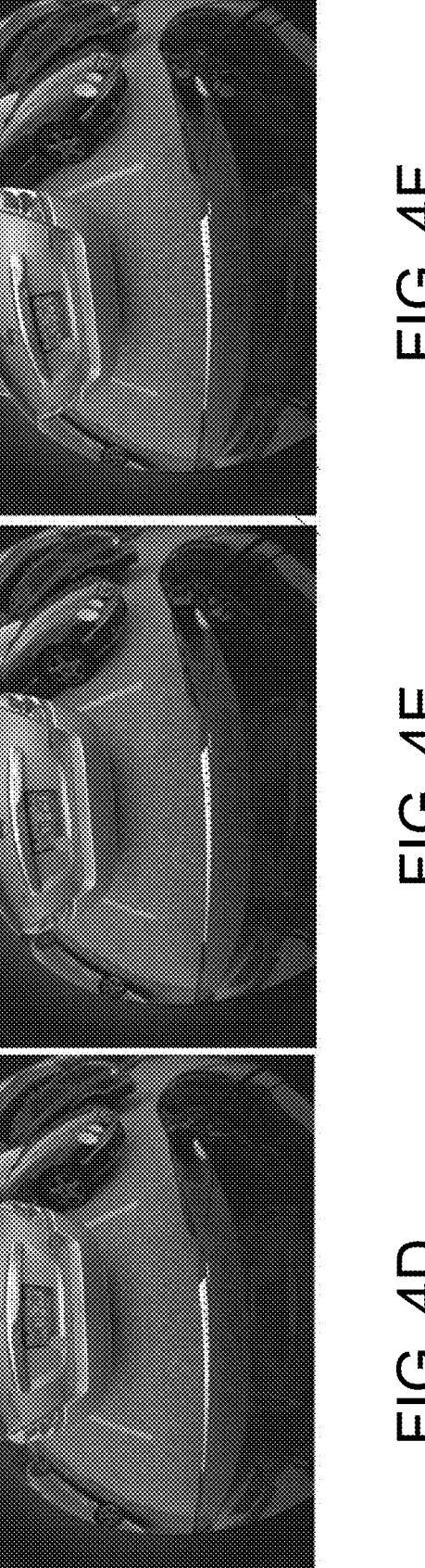

Surround awareness and driver assistance is a marketable feature for vehicles. A common feature includes generic object detection using a fisheye camera (FIGS. 2 and 3). Fisheye cameras use a wide angle lens (i.e., a fisheye lens) to obtain a large field of view. Object or obstacle detection within a scene captured by the camera generally must add value to existing detection based algorithms (such as, for example, object detection (OD), blind spot detection (BSD), automatic parking spot detection and/or the like) and/or act as a stand-alone object detection feature. Object detection may be defined as a tracking-and-detection issue that requires information on corresponding feature points in sequential images or frames of captured image data and camera parameters at each viewpoint of a moving camera. Conventional object detection often uses feature and object detection and obstacle extraction and identification.

Use of fisheye optics or lenses on vehicular cameras may have associated difficulties. Fisheye optics are seeing increasing use in smart surround view systems by providing wide fields of view without requiring multiple cameras. However, due to image distortion caused by fisheye lenses, some features cannot be measured exactly in the captured images, leading to a potential loss in accuracy when performing object detection. The inaccurate measurements of image features in these images captured by fisheye optics may create performance/robustness issues, which may lead to a temporally inconsistent object detection and/or miss detecting objects completely. Moreover, in an image captured by use of a fisheye lens, the features may not only vary in size, but also in orientation (see FIGS. 4A-4F). For example, FIGS. 4A-4F depict images captured by a camera using a fisheye lens. The images include the rear of another vehicle as the equipped vehicle passes behind the other vehicle. As is shown, due to distortions caused by the fisheye lens, the other vehicle appears to change in both size and orientation depending on the location of the other vehicle within the field of view of the camera. Specifically, the other vehicle appears to rotate or tilt as the other vehicle approaches the edge of the field of view of the camera.

Figure 5:
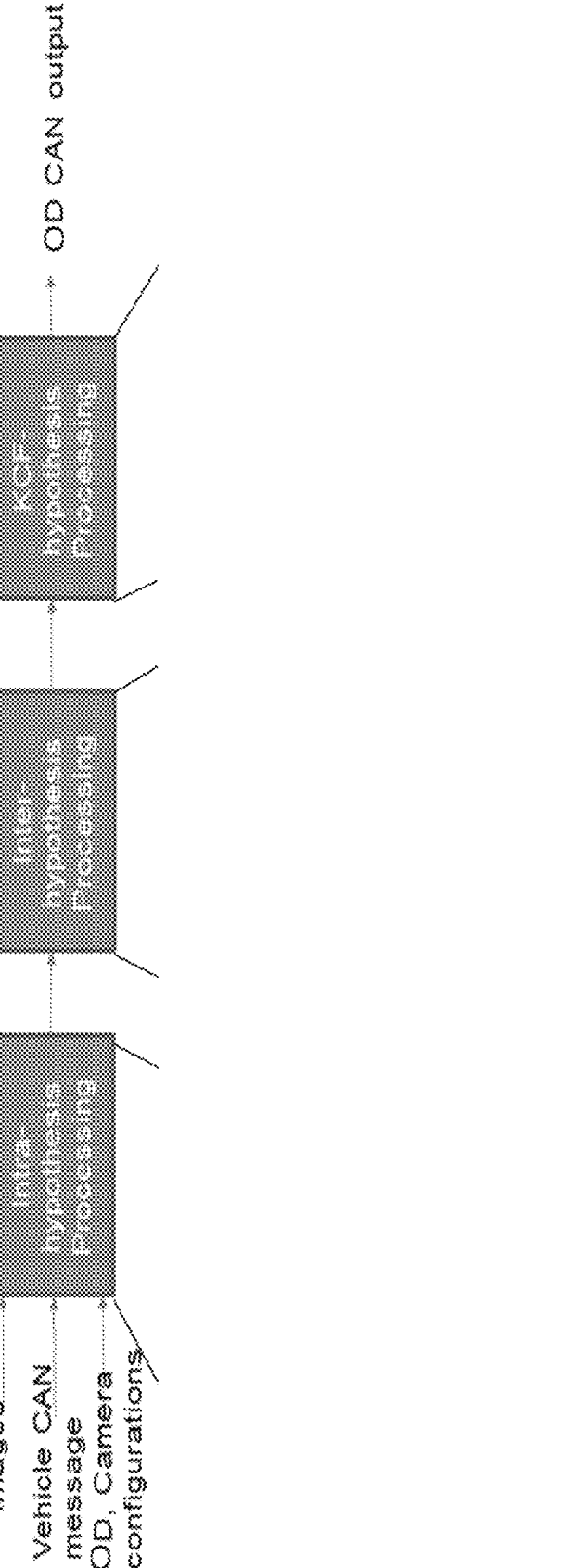
FIG. 5 is an exemplary block diagram of the vision system of FIG. 1.

Implementations herein provide a vehicular vision system that includes enhanced object detection via image processing of image data captured by one or more cameras (e.g., cameras equipped with wide-angle lenses) at the vehicle. To mitigate the effect of temporally inconsistent object detection, the vision system includes new tracking-and-detection based methods to detect objects from distorted images (e.g., captured by fisheye lenses). The system includes, such as shown in FIG. 5, an intra-hypothesis processing module, an inter-hypothesis processing module, and a kernelized correlation filter (KCF) hypothesis processing module. The system, using images captured by the camera, vehicle controller area network (CAN) messages, object detection data, and camera configuration data, generates refined or improved object detection data.

Figure 6:
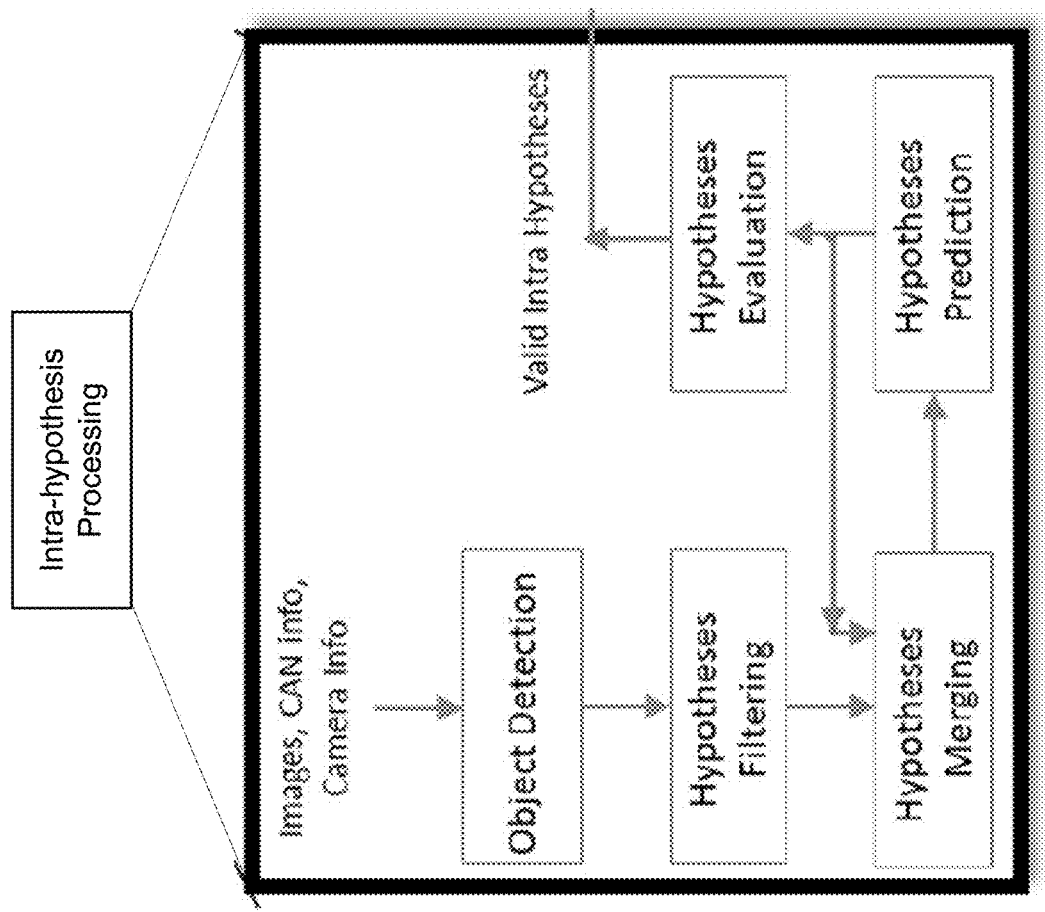
FIG. 6 is a block diagram of exemplary components of an intra-hypothesis processing module.

Referring now to FIG. 6, the intra-hypothesis processing module may include several sub-modules. For example, an object detection module receives image data (e.g., captured by the camera), camera information (e.g., information identifying or parameterizing the camera), and CAN information. The object detection submodule provides object detection data to an intra-hypothesis filtering submodule. The intra-hypothesis filtering submodule communicates with a hypothesis merging submodule, a hypothesis prediction submodule, and a hypothesis evaluation submodule. The intra-hypothesis processing module may utilize aspects of the systems described in U.S. Pat. Nos. 10,452,931; 10,204,279 and/or 10,210,404, which are hereby incorporated herein by reference in their entireties.

For example, the object detection module receives image data captured by one or more vehicle cameras (such as via a CAN bus communication network of the vehicle) and uses optional low-pass filtering, differential gradient-based feature detection and correspondent analysis by motion tracking to detect objects present in the field of view of the camera or cameras. The input image data is optionally low-pass filtered to reduce the noise in the image data or images. After that, objects are first detected from the fisheye images by differential gradient-based feature detection and correspondent analysis based on motion tracking estimation. The detected objects that have significant motion in the captured images may serve as candidates of potential objects or obstacles of interest to the system.

The output of the object detection module (indicating detected objects) is input to the hypotheses filtering module, which includes object merging, distance estimation, object evaluation, object tracking and hypotheses generation. The detected objects are merged with the objects that are detected in previous frames and tracked in the current frame, in order to ensure that more objects will be detected in the current frame. The associated distance of each object (such as distance from the vehicle) is calculated using, for example, a SfM (structure from motion) method or back-to-ground projection (e.g., in the case that SfM method fails). The objects may undergo an object evaluation to reject the objects on the ground or along the street or curb. The objects that successfully pass through the object evaluation will serve as newly generated obstacle hypotheses (for the filtered hypotheses module). An index may be used to present the reliability of the detected object, which takes into account how often this object is tracked so far, how many instances appear in the current frame, and whether the tracked object is merged with a newly detected object.

The output of the filtered hypotheses module is input to the hypotheses merging module, which includes a hypotheses similarity measure and hypotheses merging. The filtered hypotheses are compared with the predicted hypotheses, which are generated from or derived from the previous frames and tracked in the current frame. The similarity between the filtered hypotheses and predicted hypotheses are measured. Both hypotheses are combined with merging the similar hypotheses together to build assigned hypotheses.

The assigned hypotheses are input into the hypotheses prediction module, which includes, for example, Kalman filtering to generate predicted hypotheses. The assigned hypotheses are thus further processed using a modified Kalman filter and the outputs are predicted hypotheses. The modified Kalman filter is used to estimate the filtered distance of objects in the current frame and to predict the distance of obstacles in the next frame in order to keep the temporal consistency of obstacles detection. For this, the objects' distance obtained by a SfM method is represented as an input to the modified Kalman filter in order to maintain a smooth temporal switch of object distances among SfM and Back-to-Ground projection.

The predicted hypotheses may be input to the hypotheses evaluation module, which may include hypotheses evaluation and overlapped hypotheses merging. The predicted hypotheses are further evaluated according to the geometrical relationship between objects and camera position to reject objects that are not of interest to the driver or vehicle system. From the hypotheses evaluation module, the intra-hypotheses are generated.

Figure 7:
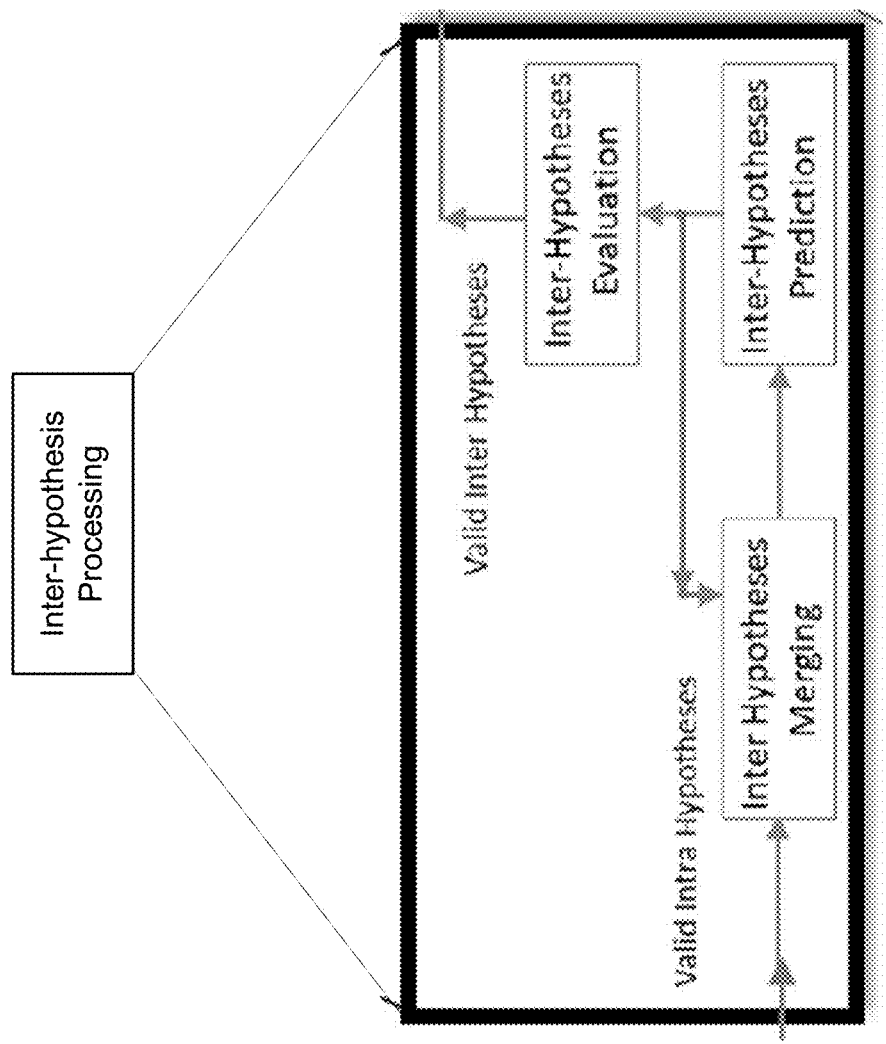
FIG. 7 is a block diagram of exemplary components of an inter-hypothesis processing module.

Referring now to FIG. 7, to reduce jumpy or inconsistent detection and improve the stability and consistency of object detection, the inter-hypotheses processing module further filters and smooths valid objects generated by the intra-hypotheses processing module (FIG. 6) and correspond to the same real objects. This module may include the following submodules: an inter-hypotheses merging submodule, an inter-hypotheses prediction submodule, and an inter-hypotheses evaluation submodule. With this module, the current valid hypotheses (i.e., from the current frame of captured image data) are merged with a tracked hypotheses which the system determined was valid in previous frames of captured image data. That is, intra-hypotheses that represent the same detected object are merged into a single inter-hypothesis, and thus the quantity of the inter-hypotheses is less than or equal to the quantity of the intra-hypotheses. After the merging, the assigned hypotheses are filtered using, for example, a Kalman filter as their predictions. These predicted results are further evaluated as valid inter-hypotheses outputs. The inter-hypotheses merging, the inter-hypotheses prediction, and the inter-hypotheses evaluation modules may operate in a manner similar to the modules of FIG. 6, only instead using valid intra-hypothesis as input instead of the filtered hypotheses from the hypotheses filtering module.

Figure 8:
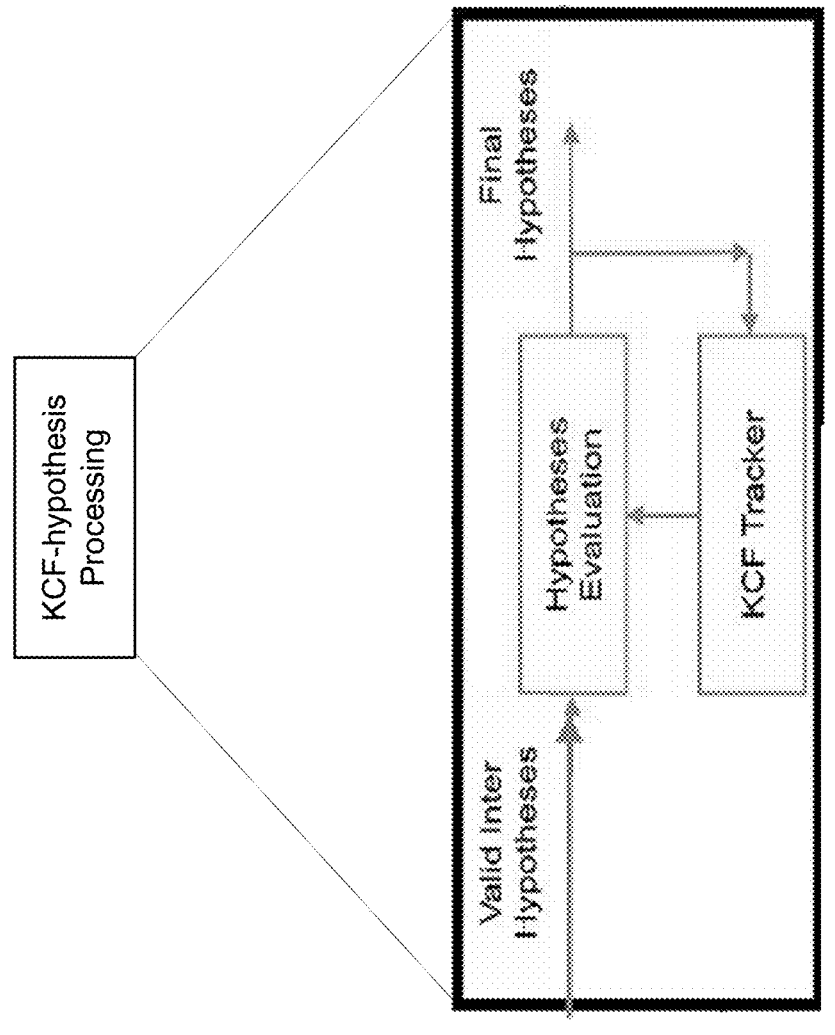
FIG. 8 is a block diagram of a kernelized correlation filter processing module.

Referring now to FIG. 8, due to significant size variation of target objects from far field to near field (i.e., the distance of the object from the vehicle), the performance of conventional object detection frameworks typically degenerate in near field. To solve this issue, implementations herein include a tracking-by-detection strategy that is applied to further track the valid inter-hypotheses which are determined valid in previous frames of captured image data. These KCF-tracked objects are combined with current valid inter-hypothesis objects to generate final outputs for the object detection framework. The KCF-hypothesis module includes a KCF tracker submodule and a Hypotheses evaluation submodule.

The inter-hypotheses processing module (FIG. 7) receives valid objects from the intra-hypotheses processing module (determined from previous frames) in order to further process and filter the hypotheses in the following frames. With this additional processing step, valid objects from different intra-hypotheses which correspond to the same object will be filtered to reduce the object jumps (i.e., the movement of the object across frames) and therefore provide stable and consistent object detection.

The KCF-hypothesis processing module (FIG. 8) receives the valid objects from the inter-hypotheses processing module (determined from previous frames). The module further tracks the objects in the following frames of image data using a tracking-by-detection algorithm (e.g. Kernelized Correlation Filters (KCF)). These tracked objects will be then combined with newly generated objects from the inter-hypotheses processing module to generate the final outputs. With this additional step, the system further improves the stability and consistency of object detection. Notably, the system improves the near-field object detection performance due to significant size variation of target objects from far to near field.

Thus, the system described herein provides enhanced object detection and tracking. The system improves upon known object tracking techniques by providing an inter-hypothesis processing module and a KCF-hypothesis processing module. The inter-hypothesis processing module merges previously valid hypotheses to further process and filter a current hypothesis. The KCF-hypothesis processing module uses a tracking-by-detection algorithm (e.g., Kernelized Correlation Filters) to further track the valid objects and combines the valid objects with newly generated objects to generate final outputs.

The methods and systems described herein may determine the motion or path of the vehicle responsive to vehicle system inputs, such as inputs from or indicative of the vehicle steering wheel angle and/or vehicle speed and/or the like, and determines the motion and relative motion of an object in the field of view of the camera. The system of the present invention may utilize aspects of the systems described in U.S. Pat. Nos. 9,946,940; 10,713,506; 9,898, 671; 9,487,235; 9,547,795; 9,563,951; 9,205,776; 10,078, 789; 10,095,935; 10,210,399; 10,755,110; 10,449,899; 10,268,904, and/or U.S. Publication No. US-2016-0180158, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:

a camera disposed at a vehicle equipped with the vehicular vision system, the camera viewing exterior of the vehicle and capturing image data;

an electronic control unit (ECU) comprising electronic circuitry and associated software;

wherein the electronic circuitry of the ECU comprises an image processor for processing image data captured by the camera;

wherein the vehicular vision system, responsive to processing at the ECU of image data captured by the camera, detects a plurality of objects present within the field of view of the camera;

wherein the vehicular vision system, responsive to detecting the plurality of objects, generates a plurality of intra-hypotheses by (i) merging detected objects in a current frame of captured image data with tracked objects from previous frames of captured image data to produce filtered hypotheses, (ii) merging the filtered hypotheses with predicted hypotheses derived from the previous frames of captured image data to produce assigned hypotheses, and (iii) applying a Kalman filter to the assigned hypotheses to produce predicted hypotheses and evaluating the predicted hypotheses to generate the plurality of intra-hypotheses, and wherein each detected object of the plurality of detected objects is represented by at least one intra-hypothesis of the plurality of intra-hypotheses;

wherein the vehicular vision system, responsive to generating the plurality of intra-hypotheses, generates a plurality of inter-hypotheses by merging (i) one or more intra-hypotheses from the current frame of captured image data that represent a single detected object with (ii) a corresponding inter-hypothesis tracked from one or more previous frames of captured image data, to generate a new inter-hypothesis for the single detected object;

wherein the vehicular vision system tracks each detected object of the plurality of detected objects based on the generated plurality of inter-hypotheses; and wherein the vehicular vision system, responsive to tracking each detected object, controls a driver assistance system of the vehicle.

2. The vehicular vision system of claim 1, wherein the vehicular vision system determines an associated distance of each detected object using a structure from motion (SfM) method or a back-to-ground projection.

3. The vehicular vision system of claim 1, wherein a quantity of the plurality of inter-hypotheses is less than a quantity of the plurality of intra-hypotheses.

4. The vehicular vision system of claim 1, wherein the vehicular vision system tracks each detected object of the plurality of detected objects using a tracking-by-detection algorithm.

5. The vehicular vision system of claim 4, wherein the tracking-by-detection algorithm comprises at least one kernelized correlation filter.

6. The vehicular vision system of claim 1, wherein the vehicular vision system merges the tracked object with newly generated objects from the plurality of inter-hypotheses.

7. The vehicular vision system of claim 1, wherein the driver assistance system comprises an automatic emergency braking system.

8. The vehicular vision system of claim 1, wherein the camera comprises a fisheye lens.

9. A vehicular vision system, the vehicular vision system comprising:

a camera disposed at a vehicle equipped with the vehicular vision system, the camera viewing exterior of the vehicle and capturing image data;

an electronic control unit (ECU) comprising electronic circuitry and associated software;

wherein the electronic circuitry of the ECU comprises an image processor for processing image data captured by the camera;

wherein the vehicular vision system, responsive to processing at the ECU of image data captured by the camera, detects a plurality of objects present within the field of view of the camera;

wherein the vehicular vision system, responsive to detecting the plurality of objects, generates a plurality of intra-hypotheses by (i) merging detected objects in a current frame of captured image data with tracked objects from previous frames of captured image data to produce filtered hypotheses, (ii) merging the filtered hypotheses with predicted hypotheses derived from the previous frames of captured image data to produce assigned hypotheses, and (iii) applying a Kalman filter to the assigned hypotheses to produce predicted hypotheses and evaluating the predicted hypotheses to generate the plurality of intra-hypotheses, and wherein each detected object of the plurality of detected objects is represented by at least one intra-hypothesis of the plurality of intra-hypotheses;

wherein the vehicular vision system, responsive to generating the plurality of intra-hypotheses, generates a plurality of inter-hypotheses by merging (i) one or more intra-hypotheses from the current frame of captured image data that represent a single detected object with (ii) a corresponding inter-hypothesis tracked from one or more previous frames of captured image data, to generate a new inter-hypothesis for the single detected object;

wherein the vehicular vision system tracks each detected object of the plurality of detected objects based on the generated plurality of inter-hypotheses, and wherein the vehicular vision system tracks each detected object of the plurality of detected objects using a tracking-by-detection algorithm; and wherein the vehicular vision system, responsive to tracking each detected object, controls a driver assistance system of the vehicle.

10. The vehicular vision system of claim 9, wherein the vehicular vision system determines an associated distance of each detected object using a structure from motion (SfM) method or a back-to-ground projection.

11. The vehicular vision system of claim 9, wherein the tracking-by-detection algorithm comprises at least one kernelized correlation filter.

12. The vehicular vision system of claim 9, wherein the driver assistance system comprises an automatic emergency braking system.

13. The vehicular vision system of claim 9, wherein the camera comprises a fisheye lens.

14. A vehicular vision system, the vehicular vision system comprising:

a camera disposed at a vehicle equipped with the vehicular vision system, the camera viewing exterior of the vehicle and capturing image data, and wherein the camera comprises a fisheye lens;

an electronic control unit (ECU) comprising electronic circuitry and associated software;

wherein the electronic circuitry of the ECU comprises an image processor for processing image data captured by the camera;

wherein the vehicular vision system, responsive to processing at the ECU of image data captured by the camera, detects a plurality of objects present within the field of view of the camera;

wherein the vehicular vision system, responsive to detecting the plurality of objects, generates a plurality of intra-hypotheses by (i) merging detected objects in a current frame of captured image data with tracked objects from previous frames of captured image data to produce filtered hypotheses, (ii) merging the filtered hypotheses with predicted hypotheses derived from the previous frames of captured image data to produce assigned hypotheses, and (iii) applying a Kalman filter to the assigned hypotheses to produce predicted hypotheses and evaluating the predicted hypotheses to generate the plurality of intra-hypotheses, and wherein each detected object of the plurality of detected objects is represented by at least one intra-hypothesis of the plurality of intra-hypotheses;

wherein the vehicular vision system, responsive to generating the plurality of intra-hypotheses, generates a plurality of inter-hypotheses by merging (i) one or more intra-hypotheses from the current frame of captured image data that represent a single detected object with (ii) a corresponding inter-hypothesis tracked from one or more previous frames of captured image data, to generate a new inter-hypothesis for the single detected object, and wherein a quantity of the plurality of inter-hypotheses is less than a quantity of the plurality of intra-hypotheses;

wherein the vehicular vision system tracks each detected object of the plurality of detected objects based on the generated plurality of inter-hypotheses; and wherein the vehicular vision system, responsive to tracking each detected object, controls a driver assistance system of the vehicle.

15. The vehicular vision system of claim 14, wherein the vehicular vision system determines an associated distance of each detected object using a structure from motion (SfM) method or a back-to-ground projection.

\* \* \* \* \*